W. A. SMITH.
BUTTON SEWING MACHINE.
APPLICATION FILED DEC. 27, 1915.

1,238,587.

Patented Aug. 28, 1917.
8 SHEETS—SHEET 4.

UNITED STATES PATENT OFFICE.

WILLARD A. SMITH, OF MELROSE, MASSACHUSETTS, ASSIGNOR TO UNITED SHOE MACHINERY COMPANY, OF PATERSON, NEW JERSEY, A CORPORATION OF NEW JERSEY.

BUTTON-SEWING MACHINE.

1,238,587.

Specification of Letters Patent.

Patented Aug. 28, 1917.

Application filed December 27, 1915. Serial No. 68,755.

*To all whom it may concern:*

Be it known that I, WILLARD A. SMITH, a citizen of the United States, residing at Melrose, in the county of Middlesex and State of Massachusetts, have invented certain new and useful Improvements in Button-Sewing Machines; and I do hereby declare the following to be a full, clear, and exact description of the invention, such as will enable others skilled in the art to which it appertains to make and use the same.

The invention relates to machines for sewing shank eyed buttons to shoe uppers or other articles to which it may be desired to attach buttons.

One object of the invention is to improve and simplify the button attaching mechanism of machines in which the buttons are attached by passing a primary loop of thread through the work and through the button eye, then passing a secondary loop through the work outside the button eye and through the primary loop, then passing the secondary loop over the button head and taking it up to tighten the knot below the button shank. To this end one feature of the invention contemplates utilizing the looper which takes the secondary loop from the loop carrying needle to carry the loop over the button head and control it while the loop is being taken up. The loop thus remains under the control of the looper as it is being contracted or taken up, and may be directed down over the button head and shank in a uniformly reliable manner without the complication incident to the use of auxiliary loop spreading and guiding mechanism. A further feature of the invention contemplates the provision of means for causing the button to assume an inclined position as the secondary loop is taken up in tightening the knot, so that the passage of the loop down below the shank is insured, even in sewing on buttons having shanks of such shape that the secondary loop might otherwise be liable to draw up around the neck of the shank. For the sake of simplicity it is preferred to employ for this purpose a spur or projection on the throat plate arranged to underlie the head of the button at one side of the shank, and cause the button to tilt in a direction to shed the secondary loop off of the shank as the loop is drawn down about the shank. The spur is preferably adjustable to vary its point of engagement with the button head so that it may operate most efficiently upon the style of button being attached.

Further objects of the invention are to provide novel and improved mechanism for presenting the buttons in attaching position, and for manipulating them during the operation of the attaching mechanism; to provide a novel and improved construction of sectional button chute which may be readily adjusted for buttons of different sizes or styles, and the upper section of which may be readily removed or replaced as occasion requires; and to otherwise improve and simplify various parts and mechanisms of the machine.

To these ends the invention comprises, in addition to the features outlined above, certain further features of construction and combinations of parts hereinafter described and set forth in the claims, the advantages of which will be apparent to those skilled in the art from the following detailed description of the machine embodying the preferred form of the invention.

In the drawings the invention is shown as embodied in a machine in which buttons are attached by passing a primary loop of thread through the work and through the button eye, then passing a secondary loop through the work outside the button eye and through the primary loop, then passing the secondary loop over the button, and finally tightening the knot thus formed. In this machine the work is clamped during the operation of the button attaching mechanism between the under face of a fixed throat plate 2 and the upper face of a vertically reciprocating clamp or presser foot 4, the throat plate and presser foot being slotted in the line of feed in the usual manner. The presser foot is formed on the upper end of a vertically movable slide 6 which is forced in a direction to clamp the work by a spring 8, and which is withdrawn between successive button attaching operations by a cam 10 on the end of the cam shaft 12, and arranged to engage one end of a bell crank lever 14, the other end of which engages an arm 16 projecting from the slide 6. The presser foot may be withdrawn to insert or remove the work by a two-arm lever 18, one arm of which is connected by a chain 20 with a treadle, and the other arm of which engages a pin 22 projecting from the lower end of the presser foot slide 6.

Figure 3:
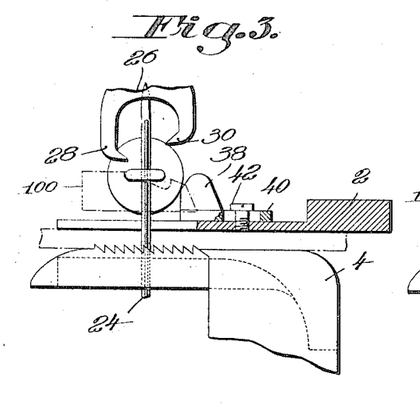
Figs. 3 to 9 are detailed views showing the mode of operation of the button attaching mechanism.
Figure 4:
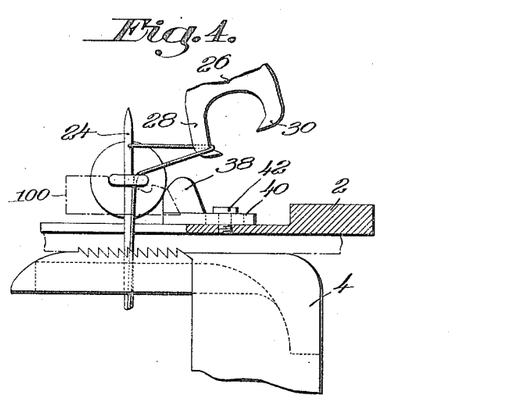
Figure 5:
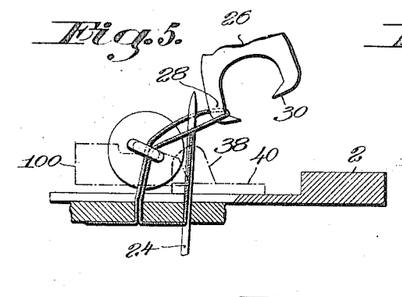
Figure 6:
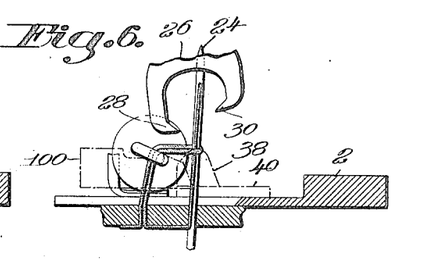
Figure 7:
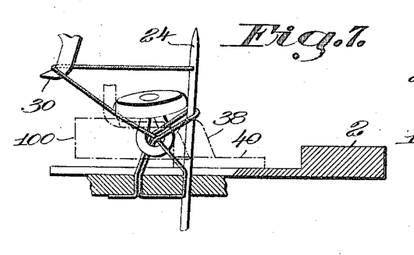
Figure 8:
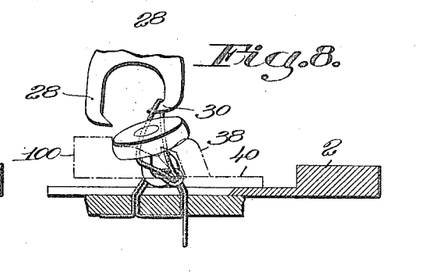
Figure 9:
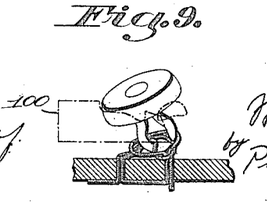

As shown, the button attaching mechanism comprises a vertically reciprocating and vibrating eye-pointed needle 24 for carrying the primary loop through the work and through the button eye, and for carrying the secondary loop through the work outside of the button eye and through the primary loop, a looper 26 provided with a loop taking finger 28 for taking the primary loop from the needle and holding it in position for the passage of the secondary loop therethrough, and also provided with a loop taking finger 30 for taking the secondary loop from the needle and carrying it over the head of the button as the secondary loop is being taken up, and takeup mechanism for taking up and controlling the thread comprising a thread clamp 32, a reciprocating cam operated takeup 34, and an auxiliary spring takeup 36. During the first upward stroke of the needle the button is held with its shank in a substantially horizontal plane, and with the eye in register with the needle, so that the needle passes up through the work and through the button eye, as indicated in Fig. 3. As the needle starts down, the looper is swung toward the right, so that the primary loop taking finger 28 takes a loop from the needle, as indicated in Fig. 4. The needle is then retracted, moved toward the right, and again advances through the material, passing outside of the button eye, as indicated in Fig. 5. Meanwhile the looper finger has moved laterally, so that the primary loop is presented in such position that the needle passes through it. During the continued upward movement of the needle the looper finger 28 moves toward the left to disengage the primary loop, which is taken up about the needle by the upward movement of the needle and the takeup devices, as indicated in Fig. 6. As the needle starts downward the second time, the looper finger 30 takes the secondary loop from the needle and carries it toward the left, as indicated in Fig. 7. About this time the button is moved into position with its head approximately parallel to the work and partially through the secondary loop, as also indicated in Fig. 7. During the downward stroke of the needle from the position indicated in Fig. 7, the takeup devices act to contract or take up the secondary loop, and during the taking up of the loop the looper finger 30 moves laterally (into the plane of the drawing) and toward the right, so that it carries the secondary loop over the head of the button, and gradually gives up the loop as the loop is being taken up or contracted by the takeup mechanism. The movement of the looper is such that the secondary loop is carried over the button head and is held under positive control until it has been so far taken up that the passage of the loop down over the shank of the button is insured. The position of the looper finger and of the primary and secondary loops just before the looper finger is disengaged from the secondary loop is indicated in Fig. 8. After the looper has directed the loop into the position indicated in Fig. 8, the continued movement of the looper finger to the right disengages the finger from the loop, after which the final taking up and tightening of the loop is completed. During the taking up and tightening of the secondary loop the button is caused to assume an inclined position, as indicated in Figs. 8 and 9, so that the secondary loop, after being released by the secondary looper finger, will pass uniformly down over the shank of the button into position to be drawn tightly about and through the primary loop below the shank, as indicated in Fig. 9. As shown, the means for causing the button to assume an inclined position during the final taking up of the secondary loop by the takeup mechanism consists of a spur or projection on the upper side of the throat plate 2 which is arranged to underlie the button head at the front side of the shank and substantially in transverse alinement with the second needle hole. During the final taking up and tightening of the secondary loop by the takeup mechanism the button shank will be drawn down toward or against the upper surface of the work, and the head of the button will engage the spur 38. Since the head is unsupported, its engagement with the spur will cause it to assume an inclined position, which will carry the neck of the shank away from the second needle hole, and bring the shank into such position that it will shed the secondary loop, in case there is any tendency for the loop to draw up into the neck of the shank and toward the button head. The spur is preferably formed on a base plate 40 which is adjustably secured to the throat plate by a screw 42 passing through a slot in the base plate. This enables the spur to be adjusted to act most efficiently upon the size or style of button which is being secured to the work.

The needle 24 is secured in the upper end of a needle bar 44 mounted to reciprocate in bearings formed in a carrier 46 which is secured to a rock shaft 48 and is oscillated at proper intervals to vary the path of reciprocation of the needle by a cam on the cam shaft (not shown). The needle bar is reciprocated through a rock shaft 50 operated by a suitable cam on the cam shaft, and connected with the needle bar through an arm 52 and link 54. The thread clamp 32 is carried on the upper end of a vertically movable bar 56, which is moved in a direction to clamp the thread by a spring 58, and is moved at proper intervals to release the thread by a cam on the cam shaft arranged to engage a roll on the end of an arm 60 secured to the rear end of a rock shaft 62 which also carries an arm 64, the end of which is pivotally connected with the lower end of the bar. The takeup roll 34 is carried on a bar 66 mounted to slide in bearings formed in the needle carrier 46, and operated through a link 68 and arm 70 from a rock shaft 72, which in turn is operated by a cam on the cam shaft. The auxiliary takeup roll 36 is carried in a sleeve 74 mounted to slide vertically on a rod 76 carried by the needle bar carrier. The sleeve is forced upward or in a direction to take up the thread by a spring 78.

The loop taking fingers 28 and 30 are formed on the lower end of the looper arm 26, which is mounted upon the forward end of a horizontal shaft 80 arranged above the throat plate, and mounted to oscillate and also to move axially in imparting the movements above described to the loop taking fingers. The shaft 80 is moved axially by a lever 82, the upper end of which carries rolls engaging an annular groove 84 in a collar 86 secured to the shaft, and the lower end of which is operated upon by a cam on the cam shaft 12. The shaft is oscillated by a lever 88, the upper end of which is connected by a link 90 to an arm 92 secured to the shaft, and the lower end of which is acted upon by a cam on the cam shaft 12. The looper arm is preferably so mounted on the forward end of the looper carrying shaft that it may be adjusted to bring the looper fingers into proper relation to the needle path. The means shown for thus securing the looper arm to the shaft comprises an arm 94 secured to the end of the shaft, and provided with a radial groove within which a rib on the back of the looper arm fits. The looper arm is secured on the arm 94 by a clamping screw 96 passing through a vertical slot in the looper arm and engaging the arm 94. The upper end of the looper arm bears against the forward end of a positioning screw 98, which may be adjusted to vary the lateral position of the looper fingers when the looper arm is clamped on the arm 94 by the clamping screw 96. The vertical slot in the looper arm permits it to be adjusted to vary the vertical position of the looper fingers.

The button is presented in attaching position by a vertical button positioning plate 100 which during the first upward stroke of the needle stands at the right of the needle path, so that the shank of the button held against the plate projects over the upper edge of the plate and lies in a horizontal plane with the eye in register with the needle. Coöperating with the positioning plate 100 is an upper plate 102 arranged with relation to the lower plate to leave a shank receiving slot through which the button shank may pass as the buttons are fed into position on the positioning plate. The upper edge of the plate 100 is recessed to form a shank positioning notch 104, the end 106 of which forms a stop for arresting the movement of the button when its shank is properly positioned on the plate. The end of the recess opposite the stop 106 is provided with a depression 108 into which the shank of the button is drawn when the primary loop is carried over into position for the passage of the secondary loop therethrough, as indicated in Fig. 5. This enables the shank of the button to assume an inclined position, so that there is less deflection of the loop between the looper and the needle hole.

Figure 12:
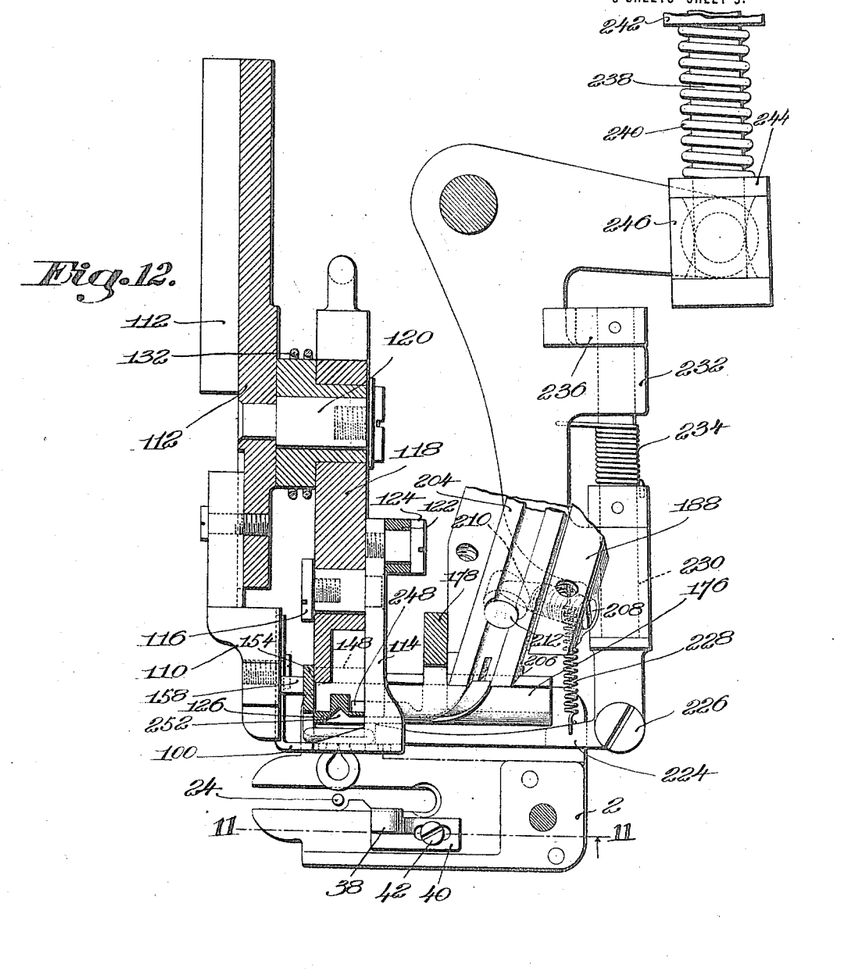
Fig. 12 is a sectional plan view on line 12—12, Fig. 10.
Figure 14:
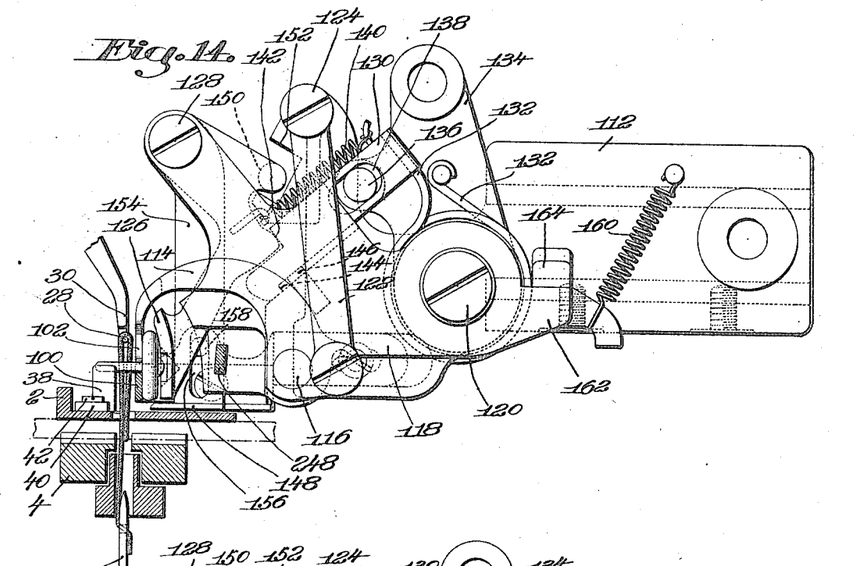
Figs. 14 and 15 are detailed front elevations showing the parts on the button carrier in different positions.

The lower plate 100 is secured upon a block 10 which is in turn secured in fixed position upon a support 112. The upper plate 102 is formed on the forward end of a lever 114 which is pivoted at 116 on a block 118 which is mounted to turn about a stud 120 projecting from the support 112. The rear end of the lever is connected by a link 122 with a pivot screw 124 projecting from the support 112, so that the upper plate will be swung rapidly up away from the lower plate 100 when the block 118 is moved upward about its pivot from the position indicated in Fig. 14 to that indicated in Fig. 15. The button is held in position against the rear faces of the plates 100 and 102 by a clamping plate 126 formed on the lower end of a lever which is pivoted at 128 on the block 118. The clamping lever is forced in a direction to clamp the button by a slide bar 130 mounted in the block 118 and forced forward by a spring 132 which is coiled about the hub of a lever 134 mounted on the stud 120 and provided with a boss forming the bearing for the block 118 (Fig. 12.) The slide bar 130 is retracted against the pressure of the spring 132 to release the button clamp by a pin 136 projecting from the lever 134 into a slot 138 in the slide bar. The clamp lever is connected with the slide bar by a comparatively light spring 140 which tends to keep the lever against a shoulder 142 near the forward end of the slide bar. The slide bar is also provided on its under side with a shoulder 144 adapted to engage a pin 146 secured in the block 118, and swing the block up about the pivot stud 120 when the button is to be released and discharged over the plate 100. When the button is to be discharged it is raised by a lifter plate 148, which normally underlies the button head, and is mounted to move upward in a path substantially parallel to the face of the plate 100. After the button is lifted, or partially lifted, it is pushed forward over the plate 100 by the clamping plate 126, which at this time is swung forward by the engagement of a pin 150 on the clamp lever with a fixed shoulder 152 on the support 112. The lifting plate 148 is formed on the lower end of an arm 154, the upper end of which is pivotally mounted on the pivot screw 128, and the lower end of which is provided with a guiding slot 156 engaging a pin 158 which projects from the block 110. The block 118 is held in normal position by a spring 160 which tends to maintain an arm 162 on the rear end of the block in engagement with a lug 164 on the support 112.

Figure 13:
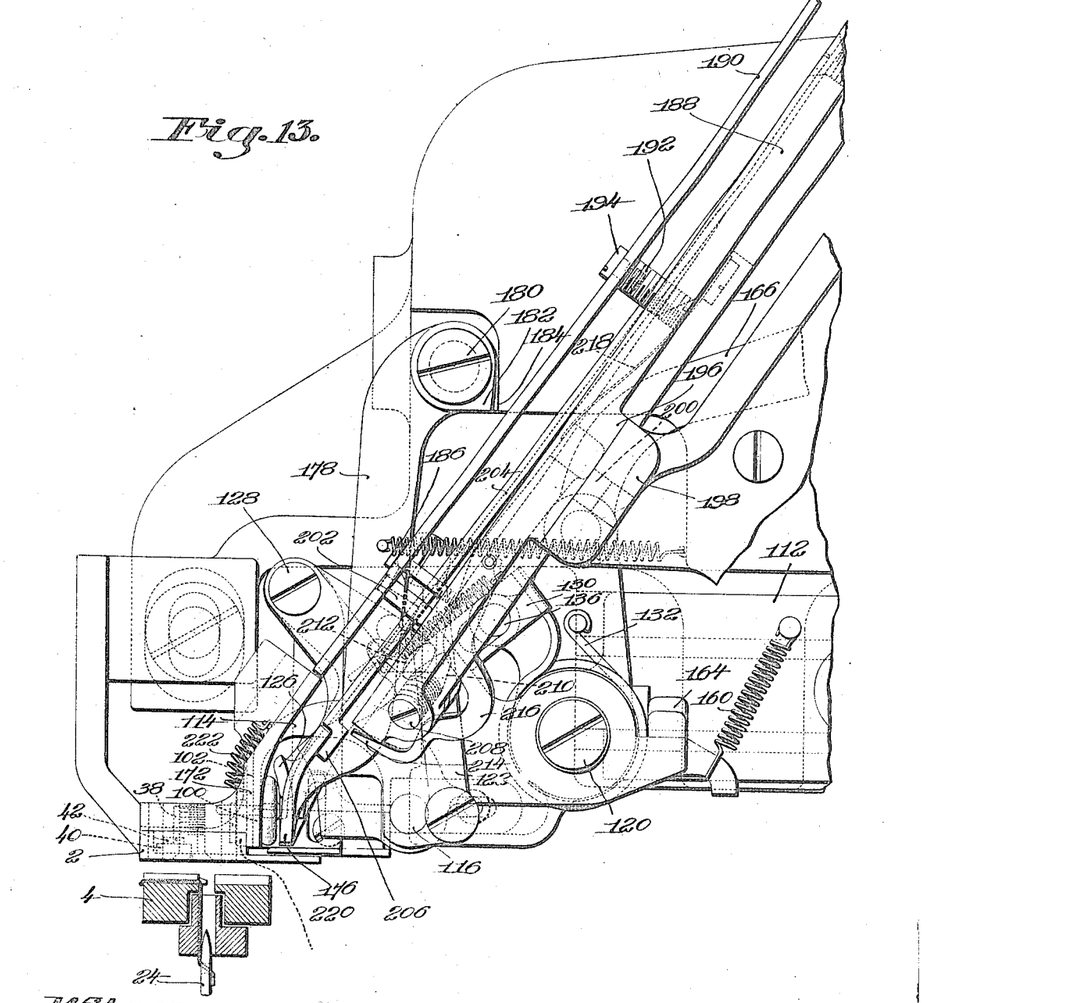
Fig. 13 is a detailed front elevation showing the lower end of the button chute and the button carrier.
Figure 15:
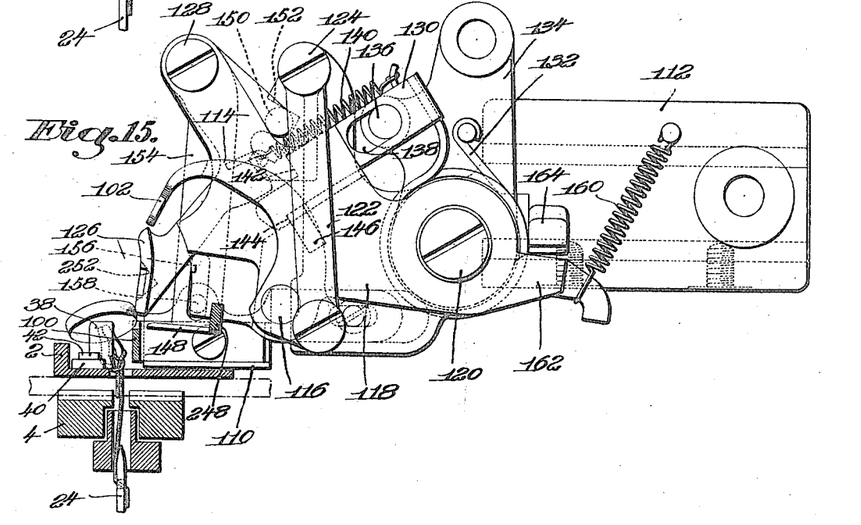
Figures 16, 17:
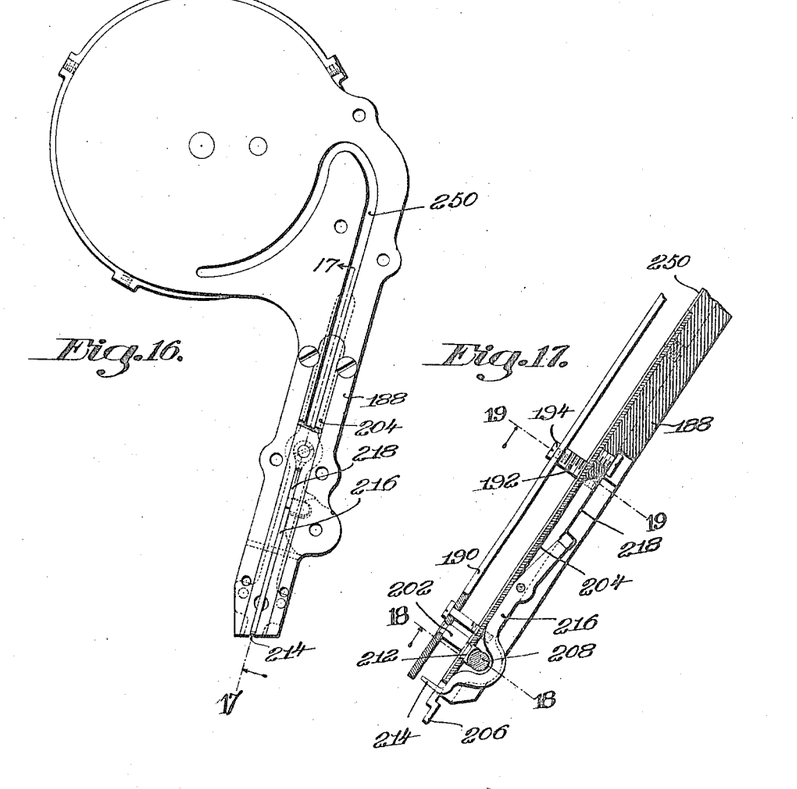
Fig. 16 is an upper face view of the base plate for the upper chute section and hopper detached from the machine.
Fig. 17 is a sectional view on line 17—17, Fig. 16.
Figure 18:
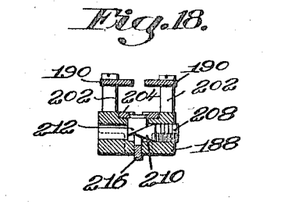
Fig. 18 is a sectional view on line 18—18, Fig. 17.
Figure 19:
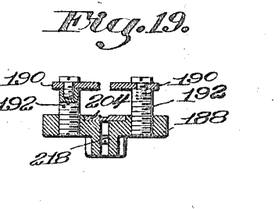
Fig. 19 is a sectional view on line 19—19, Fig. 17.

When the button is fed into position back of the positioning plates 100 and 102, with its shank projecting through the shank receiving slot between the plates, the parts are in the position indicated in Figs. 12 and 13, with the lever 134 holding the slide bar 130 in position to retract the button clamp 126, so that the button may pass freely between it and the positioning plates. After the button has been fed into position the lever 134 is moved forward into the position indicated in Fig. 14, so that the slide bar 130 may be forced forward by its spring 132 and operate the button clamp to clamp the button. When the button is to be released and discharged, the lever 134 is swung toward the right in Figs. 13 to 15, and during the first part of this movement the pin 136 retracts the slide bar 130, thus relieving the pressure of the spring 132 on the button clamp, and causing the spring 140 to retract the clamp and release the button. During the continued movement of the lever 134 the shoulder 144 engages a pin 146 and swings the block 118 from the position indicated in Fig. 14 to the position indicated in Fig. 15. During the first part of this movement of the block the upper plate 102 is swung quickly up away from the plate 100, and the lifter plate 148 begins to lift the button. As the movement of the block 118 continues, the lifter plate 148 continues to lift the button, and the pin 150 on the button clamp lever engages the shoulder 152, so that the clamp plate is swung forward and pushes the button over the positioning plate 100, as indicated in Fig. 15. Before the succeeding button is fed into position back of the positioning plate 100 the parts are returned to their initial position. The lever 134 is operated as above described through a link 166 and suitable connections from a cam on the cam shaft.

Figure 10:
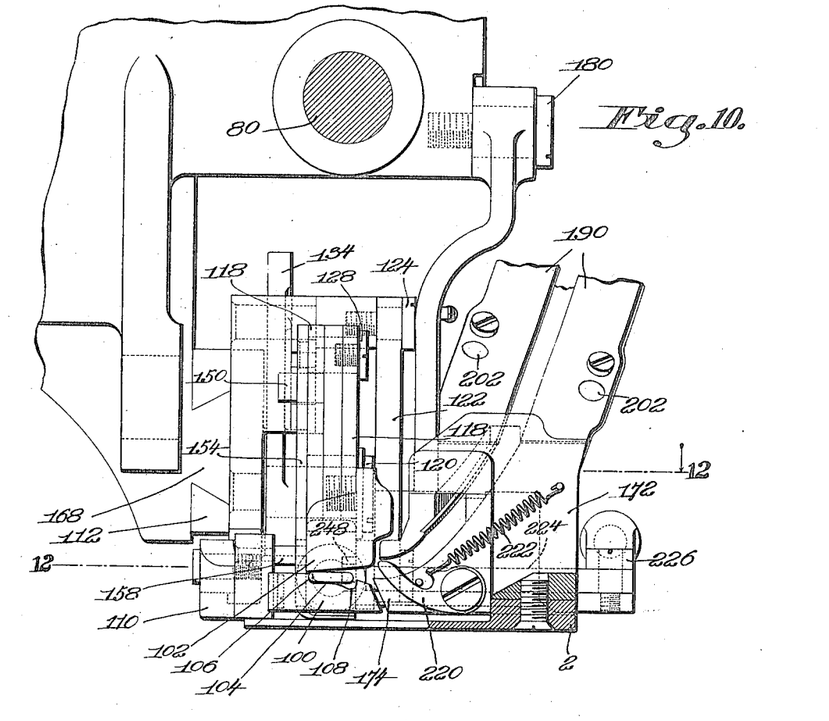
Fig. 10 is a detailed elevation showing the lower end of the button chute and the button positioning and carrying devices.
Figure 11:
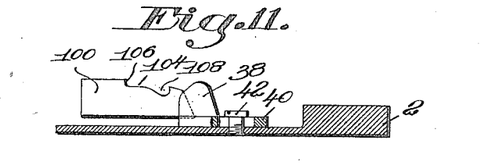
Fig. 11 is a sectional detail on line 11—11, Fig. 12.

The buttons are fed into position back of the positioning plates 100 and 102 from the lower end of a button chute, and it is preferred to arrange this chute a short distance to one side of the line of feed, and to mount the support 112 to slide transversely of the line of feed, so that the button positioning and clamping plates, and the other parts mounted upon the support, form a carrier for receiving the buttons from the lower end of the chute and carrying them transversely of the line of feed into register with the attaching mechanism. As shown, the support 112 is mounted to slide upon a fixed guideway 168, and is advanced and retracted at proper intervals through a link 170 and suitable connections by a cam on the cam shaft. The chute from which the buttons are delivered to the button carrier comprises a lower section, the parts of which are permanently secured in proper relation to the carrier and attaching mechanism, and an upper section forming a continuation of the lower section, and so mounted that it may be readily and conveniently removed and replaced as occasion requires. As shown, the permanent lower chute section comprises a standard 172 secured to the throat plate and provided with front plates 174 spaced to form a shank guiding slot which curves at its exit end to present the shanks of the buttons in approximately a horizontal position, and in line with the shank receiving slot between the positioning plates 100 and 102 when the button carrier is in register with the end of the chute, as indicated in Figs. 10, 12 and 13. The back plate 176 of the lower chute section is formed on the lower end of an arm 178, the upper end of which is pivotally supported upon a stud 180 on the machine frame, so that the back plate may be moved or adjusted toward and from the front plate in accordance with the size and shape of the button to be operated upon. The upper end of the back plate arm 178 is provided with a stop lug 182 adapted to engage a shoulder 184 on the machine frame, and thus limit the movement of the back plate away from the front plate. A spring 186 tends to draw the back plate arm into its rearward position. The upper removable chute section comprises a base or back plate 188, and two front plates 190 which are secured upon the ends of adjustable screw studs 192 by clamping screws 194, and are spaced to provide a shank guiding slot between them. The back plate 188 is provided with a boss 196 near its lower end which engages the upper face of a support 198 on the machine frame, and is held in position on the support by a pin 200 projecting from the boss 196 into a hole in the support 198. The upper end of the back plate may be supported in any suitable manner, as for instance by the devices shown and described in applicant's prior application Serial No. 31,459, filed June 1, 1915. The lower ends of the front plates 190 are supported at a fixed distance from the back plate by studs 202, so that the under surface of the plates will register accurately with and form continuations of the rear surfaces of the front plates of the lower permanent chute section. The upper chute section is provided at its lower end with an auxiliary back plate 204 in the form of a spring metal strip or plate, the upper end of which is secured to the back plate 188, and the lower end of which is arranged to be acted upon by adjusting devices through which it may be adjusted toward or from the front plates 190, in accordance with the size or shape of the buttons being operated upon. The lower end of the auxiliary plate is provided with a projection 206 arranged to engage the rear face of the movable back plate 176 of the lower chute section, and to position it with relation to the opposed front plates, and also in position to form a continuation of the auxiliary back plate of the upper chute section. The means shown for adjusting the auxiliary back plate 204 comprises an adjusting screw 208 arranged in the lower end of the back plate 188 where it is conveniently accessible to the operator, and provided with a conical inner end 210 which engages an inclined surface on the under side of a pin 212 secured in the lower end of the auxiliary back plate 204. The upper chute section is also provided at its lower end with a button stop 214 for retaining the buttons in the chute section when it is disconnected from the machine. As shown, this stop is formed on the lower end of a lever 216 pivoted to the plate 188 below the auxiliary plate 204, and forced in a direction to project the stop 214 into the chute by a spring 218. When the removable chute section is placed in position in the machine, the upper end of the lever 216 is engaged by the support 198, and the lever is swung into position to withdraw the stop 214 from the chute, and allow the buttons to slide freely down into the lower chute section, as indicated in Fig. 13. When the chute section is removed, the stop immediately returns into position to retain the buttons in the chute section.

The lower chute section is provided near its delivery end with a yielding stop in the form of a finger 220 pivoted to one of the front plates, and held in position with its free end projecting across the shank slot by a spring 222. The buttons are fed from the chute into position back of the positioning plates on the button carrier by a reciprocating feed finger 224 arranged to pass through the lower end of the chute between the back and front plates, and to push the lowermost button past the yielding stop 220 and into position with its shank against the stop 106 on the button carrier. In order that the end of the feeding finger may travel along the back plate 176 against which the heads of the buttons rest, the rear end of the finger is mounted on a vertical pivot 226, and the free end of the finger is held against the back plate by a spring 228. With this construction, the free end of the finger will travel along the surface of the back plate, whatever its adjustment with relation to the front plates, and will operate properly upon any style or size of button. In order that the feeding finger may yield vertically in case it strikes the lower edge of the second button in the chute, and swing down under this button into position to act on the first or lower button in the chute, the finger is mounted upon a rock shaft 230 carried by the oscillating feed lever 232, and held in normal position by a spring 234. The movement of the rock shaft is limited by a stop collar 236 secured on the rear end of the rock shaft, and provided with arms which straddle the lever 232 and permit a limited downward movement of the feed finger. The feed lever is reciprocated at proper intervals through a link 238 and suitable connections by a cam on the cam shaft. The link 238 is connected with the end of the lever through a spring 240 interposed between a collar 242 on the link and a sleeve 244 which bears against a pivot block 246 carried by the lever, and through which the link is adapted to slide. This spring forms a yielding connection between the feed finger and its operating cam which may yield when the forward movement of the finger is arrested by the engagement of the button shank with the stop 106 on the button carrier.

In order that the clamping plate 126 may be properly positioned with relation to the positioning plates 100 and 102 to support and guide the button head as the button is fed from the end of the chute into position between the clamping plate and positioning plates on the button carrier, the back plate 176 of the lower chute section is provided with a projection 248 which engages the rear side of the clamping plate and determines the position of the plate during the feed of the button. The position of the clamping plate is thus determined by the adjustment of the back plate of the button chute, so that the clamping plate is in proper position to support and guide whatever size or style of button the button chute is adjusted for.

In order that the machine may operate efficiently upon buttons having comparatively thin flat heads and shank eyes which pass through and project beyond the upper sides of the heads, the back plates of the button chute are provided with a central groove 250 for receiving the projecting end of the shank. The clamping plate 126 is also provided with a corresponding groove extending partially across its face and registering with the groove in the back plate 176 when the button carrier is in button receiving position. The groove 250 is not only advantageous in operating upon buttons of the style referred to and shown in the drawings, but also acts to center and properly guide round headed buttons when the machine is utilized to attach this style of button. The front face of the clamping plate is not only grooved to act to center the buttons, but is also provided with a central conical recess 252 so that it will act to properly center and clamp round-headed buttons of varying size and shape.

Figure 1:
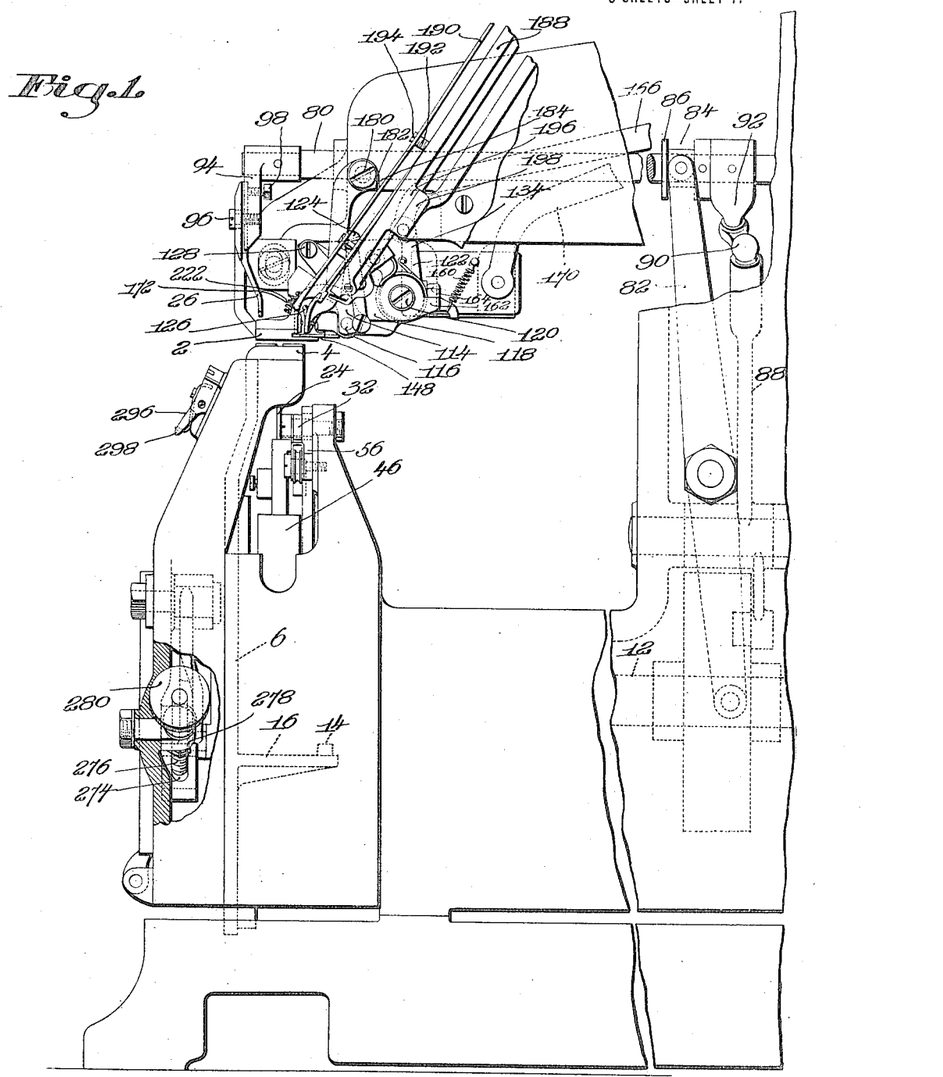
Figure 1 is a partial front elevation showing so much of a button sewing machine as is necessary to illustrate the application of the preferred form of the present invention thereto.
Figure 2:
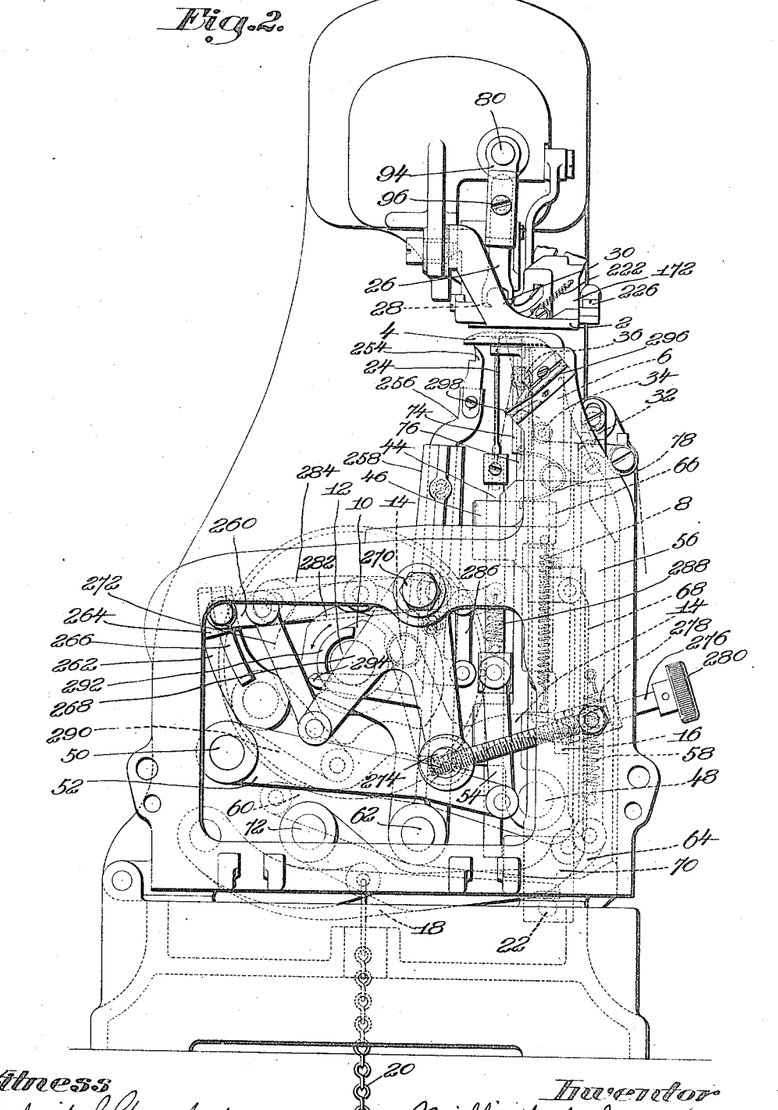
Fig. 2 is an end elevation looking toward the right in Fig. 1.

The means for feeding the work between successive button securing operations to properly space the buttons comprises a feed point 254 which is given a 4-motion movement to engage one of the needle holes of the attached buttons, and to advance the work the required distance (Fig. 2). The feed point is secured in the upper end of a feed point slide 256 mounted to move vertically in an oscillating feed arm 258. The feed arm is mounted to turn on the rock shaft 62, and is connected by a link 260 to an actuating lever 262. One end of the link is pivoted to the feed arm, and the other end is pivoted to a pivot block 264 mounted to slide on a curved guide 266 formed on one arm of the actuating lever. The curvature of the guide is such that the feed point will be returned to the same initial position, whatever the adjustment of the pivot block 264, but will be advanced during its feeding stroke varying distances, depending upon the adjustment of the block on the guide. The block is adjusted on the guide to vary the spacing of the buttons by a lever 268 pivoted at 270 to a fixed part of the machine frame, and having one end connected by a link 272 to the link 260. The other end of the adjusting lever 268 carries a pivot pin 274 through which an adjusting screw rod 276 is threaded. The adjusting rod passes through a pivoted bearing block 278, and is held from longitudinal movement in the block by collars engaging opposite sides of the block. The outer end of the rod is provided with a knurled head 280 which is within convenient reach of the operator, and by which the rod may be conveniently turned to vary the adjustment of the work feeding mechanism to secure the desired spacing of the buttons. The feed point is raised and lowered to engage it with and disengage it from the work by a cam 282 on the cam shaft arranged to engage a roll on a lever 284, the end of which is connected by a link 286 with the feed point slide. The lever 284 is held in engagement with the cam by a spring 288. The link 286 is so arranged with relation to the pivotal axis of the feed arm, and its length is so proportioned with relation to the distance between this axis and the feed point, that the feed point is caused to travel in a substantially horizontal line during its feeding stroke.

In order that shoe uppers may be conveniently positioned for sewing on the lower button, it is desirable that the presser foot and throat plate extend but a comparatively short distance beyond the sewing point. With the throat plate and presser foot thus proportioned, the feed point during its feeding movement will travel beyond the throat plate and presser foot, and during the latter part of its travel the work will be unsupported, and therefore liable to disengage itself from the feed point. To avoid this, the feed point is inclined in the direction of its feeding movement so that it will maintain its engagement with the work throughout its forward stroke.

When positioning the work between the presser foot and throat plate, and especially when positioning a shoe upper, preparatory to sewing on the lowest button, it is desirable that the space below the presser foot be free and unobstructed as close up to the needle as is practicable. To secure this result the cam groove 290 which operates the feed lever 262 is cut away to allow the feed arm and feed point to be moved back toward the sewing point by the engagement of the work with the front side of the feed point in placing the work in position in the machine. To enable the feed point to be moved into a uniform position close to the needle path, and at the same time to prevent its movement into position to interfere with the proper operation of the needle, a stop is provided for limiting the independent rearward movement of the feed point and arm, and means is also provided for rendering this stop inactive after the needle has completed its first reciprocation, so that the feed point may be moved by its cam into full retracted position where it registers with the first needle hole. In the construction shown, the stop for limiting the independent movement of the feed point and arm comprises a segmental flange 292 on the end of the cam shaft, which is arranged to be engaged by a stop lug 294 projecting laterally from the feed arm 258. When the machine has stopped at the completion of a button attaching and work feeding cycle, the stop segment 292 is in the position indicated in Fig. 2, and limits the independent return movement of the feed point so that the feed point may be moved back close to the path of reciprocation of the needle bar without danger of interfering with the proper operation of the needle. During the first reciprocation of the needle the segment 292 continues to prevent any further return movement of the feed point, but after the needle carrier has moved to the right preparatory to the second reciprocation of the needle, the stop segment passes beyond the stop lug 294, so that the feed point may be returned to its initial position by the feed cam.

The machine is provided with a thread holding spring clip 296 and a thread cutting blade 298 which are arranged directly below and in front of the sewing point, where the operator may conveniently insert and sever the thread after the sewing on of a series of buttons has been completed.

While it is preferred to employ the specific construction and arrangement of parts shown and described, it will be understood that this construction and arrangement is not essential to the broader features of the invention, and may be varied and modified as found desirable or best suited to the construction and arrangement of the parts of the machine in which such features are to be embodied.

Having explained the nature and object of the invention, and specifically described one form of mechanism in which it may be embodied, what is claimed is:—

1. A button sewing machine, having, in combination, a reciprocating needle for passing a primary loop through a button eye and a secondary loop through the primary loop outside the eye, a looper for taking the secondary loop, and means for moving the looper to carry the loop over the button head and retain control of it while it is being taken up.

2. A button sewing machine, having, in combination, a reciprocating needle for passing a primary loop through a button eye and a secondary loop through the primary loop outside the eye, a looper for taking the secondary loop, and means for moving the looper transversely and toward the needle path to retain and direct the loop down over the button head and shank while it is being taken up.

3. A button sewing machine, having, in combination, a reciprocating needle for passing a primary loop through a button eye and a secondary loop through the primary loop outside the eye, a looper for taking the secondary loop, and means for actuating the looper to take the secondary loop and to retain it substantially taut while the loop is being taken up.

4. A button sewing machine, having, in combination, a reciprocating eye-pointed needle for passing a primary loop through a button eye and a secondary loop through the primary loop outside the eye, a looper, and mechanism for actuating the looper to take the secondary loop and hold it in position for the passage of the button therethrough, and thereafter to move in a direction to retain the loop and direct it down under the button head as the loop is being taken up.

5. A button sewing machine, having, in combination, a reciprocating eye-pointed needle for passing a primary loop through a button eye and a secondary loop through the primary loop outside the eye, a reciprocating looper provided with two loop taking fingers for taking the primary and secondary loops from the needle, and means for moving the looper in a direction to retain the secondary loop and direct it down under the button head as it is being taken up.

6. A button sewing machine, having, in combination, mechanism for forming interlocking primary and secondary button attaching loops and for passing the secondary loop over the button, and means for causing the button to assume an inclined position as the secondary loop is taken up in tightening the knot.

7. A button sewing machine, having, in combination, mechanism for forming interlocking primary and secondary button attaching loops and for passing the secondary loop over the button, and a spur arranged to underlie the button head on one side of the shank during the tightening of the secondary loop.

8. A button sewing machine, having, in combination, mechanism for forming interlocking primary and secondary button attaching loops and for passing the secondary loop over the button, and a spur arranged to underlie the button head on one side of the shank during the tightening of the secondary loop adjustable to vary its point of engagement with the button head.

9. A button sewing machine, having, in combination, a reciprocating needle for passing a primary loop through a button eye and a secondary loop through the primary loop outside the eye, a looper for taking the secondary loop, means for moving the looper to carry the loop over the button head and control it while the loop is being taken up, and means for causing the button to assume an inclined position as the loop is being drawn down over the button shank.

10. A button sewing machine, having, in combination, a reciprocating needle for passing a primary loop through a button eye and a secondary loop through the primary loop outside the eye, means for passing the secondary loop over the button, and means for causing the button to assume an inclined position as the loop is being drawn down over the button shank.

11. A button sewing machine, having, in combination, button attaching mechanism, a button positioning plate against which the button is clamped, a button lifter, and means for pushing the button over the plate when lifted.

12. A button sewing machine, having, in combination, button sewing mechanism, a positioning plate having a shank supporting upper edge, a button lifter, a button clamp, and mechanism for operating the clamp to clamp and release the button and to push the button over the plate when lifted.

13. A button sewing machine, having, in combination, button attaching mechanism, a positioning plate having a shank supporting upper edge, a button lifter mounted to move parallel to the plate, and means for pushing the button over the plate when lifted.

14. A button sewing machine, having, in combination, button attaching mechanism, a positioning plate having a shank supporting upper edge, a vertically moving button lifter, and a horizontally moving button pushing device.

15. A button sewing machine, having, in combination, button attaching mechanism, a button positioning plate having a shank supporting upper edge, a clamp for clamping the button against the plate, a vertically swinging block on which the clamp is mounted, a button lifter connected to be operated by the vertical movement of the block, and means for giving the clamp a button pushing movement through the vertical movement of the block.

16. A button sewing machine, having, in combination, button attaching mechanism, a button positioning plate having a shank supporting upper edge, a vertically movable upper plate, a button clamp, a button lifter, a vertically movable block on which the upper plate, clamp and lifter are mounted, and means through which the upper plate and lifter are raised and the clamp given a button pushing movement by the upward movement of the block.

17. A button sewing machine, having, in combination, button attaching mechanism, a button positioning plate having a shank supporting upper edge, a vertically movable upper plate, a lever carrying the upper plate, a vertically movable block on which the lever is mounted, and a link having one end connected with the lever and the other to a fixed pivot.

18. A button sewing machine, having, in combination, button attaching mechanism, a button positioning plate having a shank supporting upper edge, a button clamp, a vertically movable block on which the button clamp is pivoted, a spring pressed slide bar arranged to engage the clamp, means for retracting and releasing the bar and for raising the block, an abutment engaged by the clamp during the upward movement of the block to give the clamp a button pushing movement, and a spring for retracting the clamp.

19. A button sewing machine, having, in combination, button attaching mechanism, a button positioning plate having a shank supporting upper edge, a button lifter, a vertically movable block on which the lifter is pivoted, and guiding devices for causing the lifter to move approximately parallel to the positioning plate during the upward movement of the block.

20. A button sewing machine, having, in combination, button attaching mechanism, a button positioning plate, a button clamp for clamping the button against the plate, and a button chute having a back plate provided with a projecting stop for determining the position of the clamp when the button head passes between the plate and clamp.

21. A button sewing machine, having, in combination, button attaching mechanism, a button positioning plate, a button clamp, a button chute having a front plate with which the positioning plate registers, and an adjustable back plate having a projection for positioning the clamp.

22. A button sewing machine, having, in combination, button attaching mechanism, a button chute having a front plate and an adjustable back plate, a carrier having a button positioning plate and a button clamp, means for reciprocating the carrier between the end of the chute and the button attaching mechanism, and a projection on the back plate of the chute arranged to position the clamp when the carrier is at the end of the chute.

23. A button sewing machine, having, in combination, a button chute provided with a back plate and a front plate having a shank guiding slot, a feeding finger arranged to reciprocate through the delivery end of the chute to remove the end button, and a spring for causing the end of the finger to slide along the back plate.

24. A button sewing machine, having, in combination, a button chute provided with a back plate and a front plate having a shank guiding slot, an oscillating feeding finger pivoted on the lever and arranged to pass through the lower end of the chute between the front and back plates, and a spring for holding the free end of the finger against the back plate.

25. A button sewing machine, having, in combination, a permanent feed chute section having a back plate and a front plate provided with a shank guiding slot which curves at its exit end to present the button shanks approximately horizontally, a removable upper chute section having back and front plates adapted to register with the back and front plates of the permanent chute section, button attaching mechanism, and means for feeding buttons from the permanent chute section to the button attaching mechanism.

26. A button sewing machine, having, in combination, button attaching mechanism, button feeding mechanism, a feed chute section permanently mounted in coöperative relation to the feeding mechanism having a back plate and a front plate provided with a shank guiding slot which curves at its exit end to present the button shanks approximately horizontally, and a removable upper section having back and front plates adapted to register with the back and front plates of the permanent chute section.

27. A button sewing machine, having, in combination, a permanent lower chute section comprising a back plate and a front plate provided with a shank guiding slot which curves at its exit end to present the button shanks approximately horizontally, means for removing the end button from the chute section, and a removable chute section comprising front and back plates arranged to register with the front and back plates of the permanent section.

28. A button sewing machine, having, in combination, a permanent lower button chute section comprising a movable back plate and a front plate provided with a shank guiding slot, an upper removable chute section comprising front plates having a shank guiding slot between them, and a back plate having an adjustable lower end provided with means for positioning the back plate of the lower section.

29. A button sewing machine, having, in combination a permanent lower button chute section comprising a movable back plate and a front plate provided with a shank guiding slot, an upper chute section comprising front plates having a shank guiding slot between them, and a back plate having an adjustable lower end provided with means for positioning the back plate of the lower section, a support on which the upper chute section is detachably mounted, and a button stop at the lower end of the upper section arranged to be rendered inactive by engagement with the support.

30. A button chute for button sewing machines comprising front plates spaced to form a shank guiding slot between them, and a back plate for supporting the button heads provided with a central longitudinal groove.

31. A button chute for button sewing machines comprising a head supporting back plate, shank guiding front plates, an auxiliary spring plate at the delivery end of the chute, and a laterally projecting adjusting screw having a conical end for adjusting the spring plate with relation to the front plates.

32. A button sewing machine, having, in combination, button attaching mechanism, an oscillating feed arm, a forwardly inclined feed point on the arm adapted to enter a needle hole in the work, means for oscillating the arm, and means for engaging the feed point with and disengaging it from the work.

33. A button sewing machine, having, in combination, button attaching sewing mechanism, a throat plate, a presser foot below the throat plate, an oscillating feed arm, a forwardly inclined feed point on the arm adapted to enter a needle hole in the work, means for oscillating the feed arm to carry the feed point beyond the throat plate, and means for engaging the feed point with and disengaging it from the work.

34. A button sewing machine, having, in combination, a reciprocating and vibrating needle bar below the work, a feed arm below the work, a feed point mounted in the arm, a feed cam for advancing the feed arm recessed to permit independent return movement of the arm, adjustable connections between the cam and arm for varying the forward stroke of the arm, and a stop rendered inactive when the needle bar has moved out of alinement with the first needle hole for limiting the independent return movement of the feed arm.

35. A button sewing machine, having, in combination, a reciprocating and vibrating needle bar below the work, a feed arm below the work, a feed point mounted in the arm for engaging the first needle hole, a cam for advancing the feed arm and returning it into alinement with the first needle hole recessed to permit independent return movement of the feed arm, connections between the cam and feed arm for varying the forward stroke of the arm, and a segmental rotary stop for limiting the independent return movement of the arm.

36. A button sewing machine, having, in combination, button attaching mechanism, an oscillating feed arm, a feed point on the arm for engaging the work, an actuating lever having a curved guide, a link having one end connected with the feed arm and the other connected with a slide engaging the guide, a lever connected to move the slide, and a screw threaded rod for adjusting the lever having one end accessible to the operator.

37. A button sewing machine, having, in combination, mechanism for passing a primary loop through a button eye and a secondary loop through the primary loop outside the eye and for taking up the loops, and means for carrying the secondary loop down over the button head while maintaining it substantially taut as it is being taken up.

38. A button sewing machine, having, in combination, a reciprocating eye pointed needle for passing a primary loop through a button eye and a secondary loop through the primary loop outside the eye, means for taking the primary loop and holding it for the passage therethrough of the secondary loop, and means for carrying the secondary loop down over the button head while maintaining it substantially taut as it is being taken up.

WILLARD A. SMITH.

Copies of this patent may be obtained for five cents each, by addressing the "Commissioner of Patents, Washington, D. C."